United States Patent
Petri

(10) Patent No.: US 8,301,591 B2
(45) Date of Patent: Oct. 30, 2012

(54) MULTI-PHASE SYNCHRONIZATION IN A CONTENT MANAGEMENT SYSTEM

(75) Inventor: John Edward Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 12/270,012

(22) Filed: Nov. 13, 2008

(65) Prior Publication Data

US 2010/0121816 A1 May 13, 2010

(51) Int. Cl.
G06F 17/30 (2006.01)

(52) U.S. Cl. ......... 707/612; 707/618; 707/620; 709/246

(58) Field of Classification Search ................. 707/611, 707/694, 618, 620; 709/246
See application file for complete search history.

(56) References Cited

U.S. PATENT DOCUMENTS

| | | | | |
|---|---|---|---|---|
| 6,304,601 B1 * | 10/2001 | Davison | ......... | 375/240 |
| 7,313,825 B2 * | 12/2007 | Redlich et al. | ......... | 726/27 |
| 2003/0182450 A1 * | 9/2003 | Ong et al. | ......... | 709/246 |
| 2004/0068728 A1 | 4/2004 | Blevins | | |
| 2004/0205656 A1 | 10/2004 | Reulein et al. | | |
| 2007/0203954 A1 * | 8/2007 | Vargas et al. | ......... | 707/201 |
| 2009/0083247 A1 * | 3/2009 | Cragun et al. | ......... | 707/5 |

OTHER PUBLICATIONS

U.S. Appl. No. 11/853,870, filed Sep. 12, 2007, entitled "Method and System for Updating Document Content and Metadata via Plug-in Chaining in a Content Management System", by David Herbeck et al.
Improving Efficiency of XPath-based XML Querying: http://wam.inrialpes.fr/publications/2004/toward-xpath-efficiency.pdf.
High Performance XML Data Retrieval: http://www.idealliance.org/papers/dx_xmle04/slides/scardina.pdf.
Compiled XPath Expressions (see pp. 14 and 15 of High Performance XML Data Retrieval by Mark V. Scardina et al.—http://www.idealliance.org/papers/dx_xmle04/slides/scardina.pdf).

* cited by examiner

Primary Examiner — Shahid Alam
(74) Attorney, Agent, or Firm — Martin & Associates, LLC; Derek P. Martin

(57) ABSTRACT

A content management system (CMS) provides a way to add a phase property to synchronization rules. In one suitable implementation, each of the synchronization rules has a corresponding phase value. In another suitable implementation, there are default synchronization rules and only synchronization rules other than the default synchronization rules have a phase value. A phase synchronization mechanism uses the phase property of the synchronization rules to evaluate only appropriate synchronization rules at each step as required.

15 Claims, 7 Drawing Sheets

```
<DocTypePluginList name="XMLPluginList">
        <PluginRef name="XIncludeResolver" />         ——610
        <PluginRef name="XMLBidiSynch">                ——620
                <Parm name="phase" value="1" />  ——190
        </PluginRef>
        <PluginRef name="ExecuteXMLQueries" />        ——630
        <PluginRef name="XMLBidiSynch">                ——640
                <Parm name="phase" value="2" />  ——190
        </PluginRef>
        <PluginRef name="XMLValidation" />             ——650
</DocTypePluginList>
```

```
<Synchronization>
        <AttributeToContent contentXPath="/book/chapter/xml-query/
        attribute::chapterNum" phase="1">                                ——710
                <Variables>
                        <VariableDeclaration name="chap_num"><ContentXPath
                xPath="/book/chapter/attribute::number" /></
        VariableDeclaration>
                </Variables>
                <Content><Variable name="chap_num" /></Content>
        </AttributeToContent>
        <AttributeToContent contentXPath="/book/chapter/title" phase="2">   ——720
                <Variables>
                        <VariableDeclaration name="title_attr"><Attribute
                attribute="title" /></VariableDeclaration>
                </Variables>
                <Content><Variable name="title_attr" /></Content>
        </AttributeToContent>
</Synchronization>
```

MULTI-PHASE SYNCHRONIZATION IN A CONTENT MANAGEMENT SYSTEM

CROSS-REFERENCE TO RELATED APPLICATION

This patent application is related to U.S. patent application "METHOD AND SYSTEM FOR UPDATING DOCUMENT CONTENT AND METADATA VIA PLUG-IN CHAINING IN A CONTENT MANAGEMENT SYSTEM", Ser. No. 11/853,870 filed on Sep. 12, 2007, which is incorporated herein by reference.

BACKGROUND

1. Technical Field

This disclosure generally relates to content management systems, and more specifically relates to synchronizing information in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Known content management systems check their rules when content comes into or out of the system. If a rule is satisfied, the CMS may perform subsequent processing on the content. Known content management systems may include rules related to bursting, linking, and synchronization. Bursting rules govern how a document is bursted, or broken into individual chunks, when the document is checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

Another aspect of XML content management involves the assembly of data from various sources into "master" or "parent" documents. A master or parent document can be thought of as a shell or assembly template that gets populated dynamically by the CMS (e.g. when a user views the master or parent document). The most common type of data assembly is reconstitution, or reassembly, of an XML document from a collection of individual chunks or elements in the repository. One way to reconstitute a document is by creating a plug-in chain, which is the subject of the related application "METHOD AND SYSTEM FOR UPDATING DOCUMENT CONTENT AND METADATA VIA PLUG-IN CHAINING IN A CONTENT MANAGEMENT SYSTEM" referenced above. With a plug-in chain the user has much more control over when the CMS executes queries and content rules. However, when content rules need to be evaluated, all of the rules of a specific type (i.e. bursting, linking, synchronization, etc.) must be evaluated, leading to the execution of rules that may not need to be evaluated. A good example of executing unnecessary content rules is synchronization rules.

In known prior art, the assembly of data for an XML document, either with chunk reconstitution or queries, occurs before synchronization. This happens so that the entire resolved XML content can be used when evaluating synchronization rules and because synchronization rules often need to reference multiple elements throughout the master or parent document. Since elements and chunks are themselves templates of CMS chunks, or nested embedded queries, the synchronization rules need to be evaluated repeatedly. However, there are cases where the content will be incorrect if the content is not synchronized both before and after the data is assembled into the parent document. To ensure correct data, all of the synchronization rules must be evaluated every time synchronization might be needed. This results in increased times for documents to be reconstituted and lag time to the user. Without a way to only evaluate the synchronization rules needed for a particular synchronization function, the computer industry will suffer from increasing delays of document reconstitution.

BRIEF SUMMARY

A content management system (CMS) provides a way to add a phase property to synchronization rules. In one suitable implementation, each of the synchronization rules has a corresponding phase value. In another suitable implementation, there are default synchronization rules and only synchronization rules other than the default synchronization rules have a phase value. A phase synchronization mechanism uses the phase property of the synchronization rules to evaluate only appropriate synchronization rules at each step as required.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 6 shows a sample plug-in chain;

FIG. 7 shows a sample set of synchronization rules with phase values;

DETAILED DESCRIPTION

The claims and disclosure herein provide a content management system (CMS) that adds a phase property to one or more synchronization rules to evaluate only needed synchronization rules at different times when synchronization is needed.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
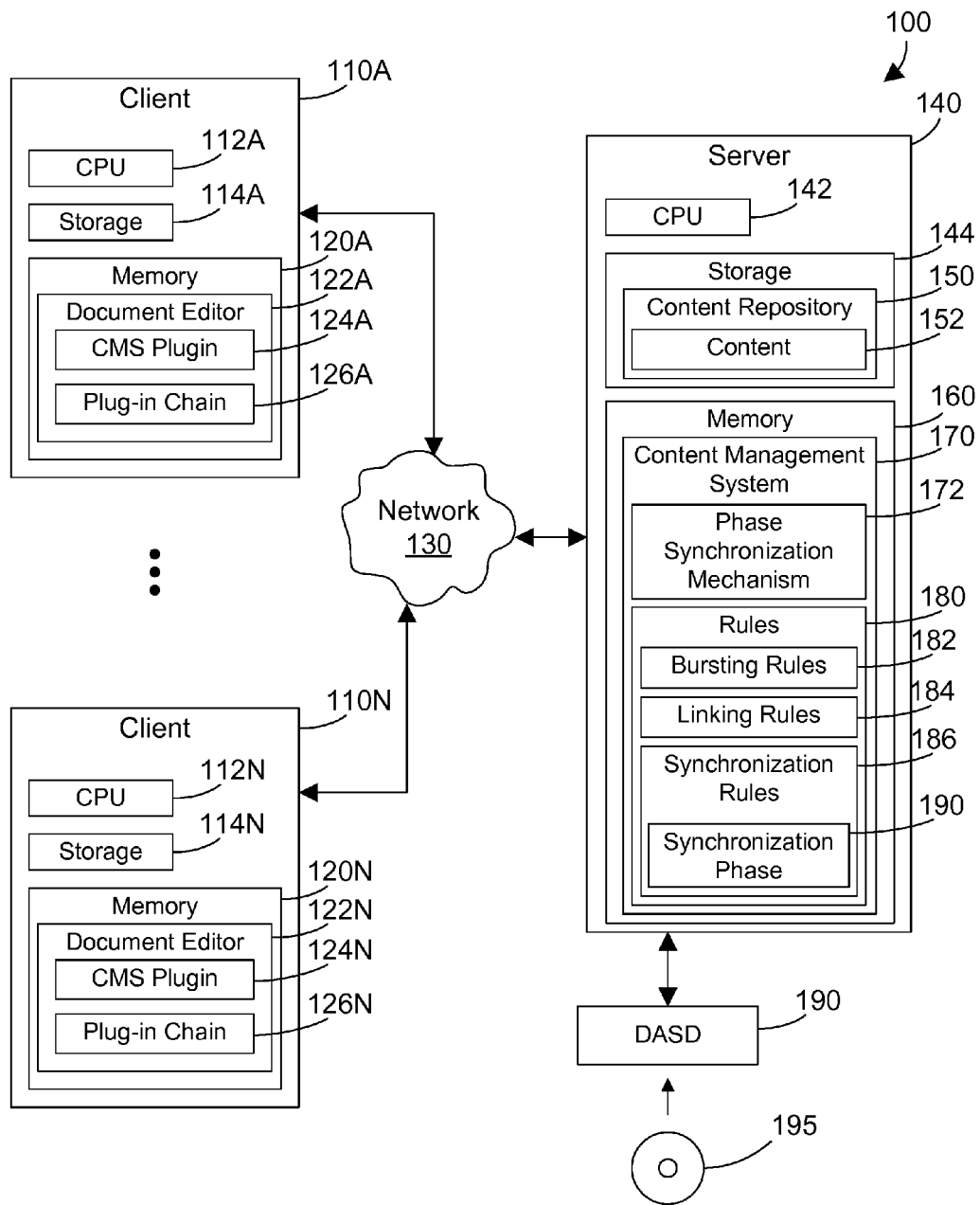
FIG. 1 is a block diagram of a networked computer system that includes a server computer system that has a content management system that includes a phase synchronization mechanism.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In addition, the client 110 may optionally include a plug-in chain 126A similar to those discussed in the related application referenced above. However, unlike the plug-in chains in the related application, the plug-in chain 126A may include references to subsets of the synchronization rules as discussed in more detail below. In similar fashion, other clients have similar components shown in client 110A, through client 110N, which includes a CPU 112N, storage 114N, memory 120N, a document editor 122N, a CMS plugin 124N, and a plug-in chain 126N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a phase synchronization mechanism 172 and rules 180.

Phase synchronization mechanism 172 is used to evaluate only applicable synchronization rules. Rules 180 include bursting rules 182, linking rules 184, and synchronization rules 186. Synchronization rules 186 contain a synchronization phase field 190. Synchronization phase field 190 indicates which synchronization rules are attached to a specific phase. The term "phase" as used in the disclosure and claims herein refers to any number or set of synchronization rules. Of course, other rules, whether currently known or developed in the future, could also be included in rules 180.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The phase synchronization mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
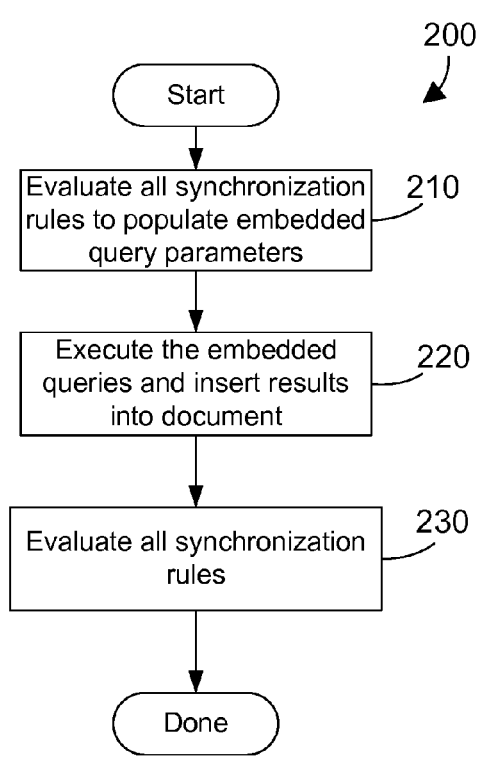
FIG. 2 is a flow diagram of a prior art method for synchronizing a document populated with embedded queries.

Referring to FIG. 2, a prior art method 200 for reconstituting a document by using embedded queries begins by evaluating all of the synchronization rules so that the embedded query parameters contain the correct values (step 210). The embedded queries are then executed and the results from the queries are inserted into the document (step 220). All of the synchronization rules are then evaluated (step 230) and method 200 is done. While method 200 shown in FIG. 2 seems fairly efficient when there are not very many synchronization rules defined, in practice the complexity and time spent evaluating unnecessary synchronization rules in the prior art is very inefficient and time is wasted evaluating synchronization rules that may not need to be evaluated.

Figure 3:
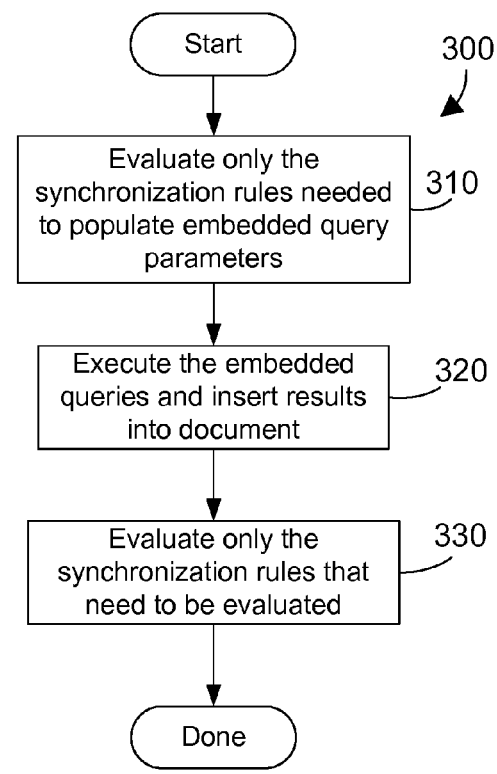
FIG. 3 is a flow diagram of a method for synchronizing a document populated with embedded queries.

Referring to FIG. 3, a method 300 for reconstituting a document by using embedded queries begins by evaluating only the synchronization rules needed so that the embedded query parameters contain the correct values (step 310). The embedded queries are then executed and the results from the queries are inserted into the document (step 320). Only the synchronization rules that need to be evaluated are then evaluated (step 330) and method 300 is done. Method 300 expressly deals with documents that are reconstituted with embedded queries. However, the disclosure and claims herein expressly extend to any method for reconstituting a document whether it be embedded queries, stylesheets, or any other method whether currently known or developed in the future.

Figure 4:
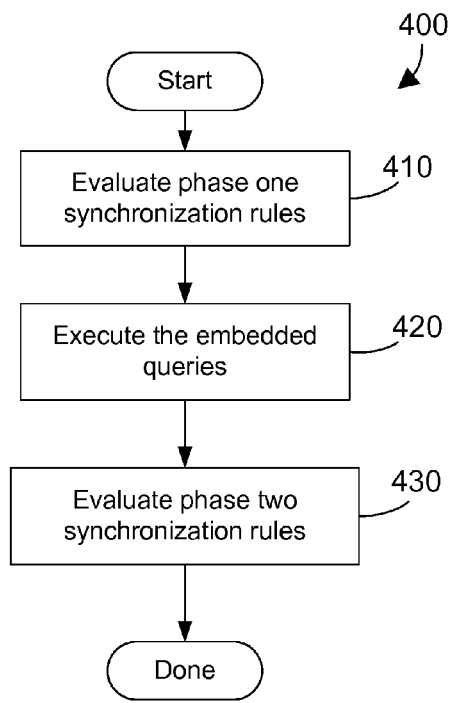
FIG. 4 is a flow diagram showing one specific implementation of the method of FIG. 3 when a document has two phases of synchronization.

Referring to FIG. 4, a method 400 is one suitable implementation of method 300 in FIG. 3. It is assumed that the system administrator has already configured the CMS to contain phase one and phase two synchronization rules. The phase one synchronization rules are preferably a subset of the synchronization rules, and the phase two synchronization rules are preferably a subset of the synchronization rules, with one of the two subsets containing at least one synchronization rule that is not found in the other subset. In other words, the subsets are different. Phase one synchronization rules are evaluated (step 410). While not expressly recited, step 410 populates the embedded query parameters. The embedded queries are then executed (step 420). Phase two synchronization rules are evaluated (step 430) and method 400 is done.

Figure 5:
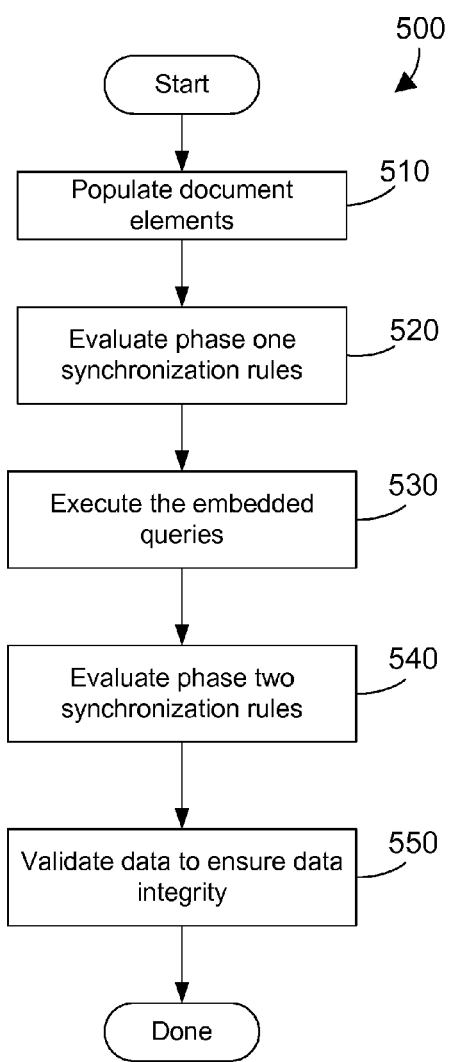
FIG. 5 is a flow diagram showing another specific implementation of the method of FIG. 3 when a document has three phases of synchronization.

Referring to FIG. 5, a method 500 is another suitable implementation of method 300 in FIG. 3. Again it is assumed that the system administrator has already configured the CMS to contain phase one and phase two synchronization rules. Method 500 begins by populating as many elements into the parent document as possible (step 510). Phase one synchronization rules are then evaluated (step 520). Again notice that step 520 populates the embedded query parameters. The embedded queries are then executed (step 530). The phase two synchronization rules are then evaluated (step 540). The data is then validated to ensure data integrity (step 550) and method 500 is done.

A simple example is now given to illustrate the method of FIGS. 3-5. In the current example we will use SCORE's XML content management system by IBM. While the example herein discusses SCORE's XML content management system as one possible example of a content management system, the disclosure and claims herein expressly extend to any content management system. SCORE uses a plug-in model where a list of plug-ins can be configured together in a single plug-in chain. An example of a type of plug-in chain is shown in FIG. 6. Notice plug-in list 600 shows two synchronization tasks (620 and 640 in FIG. 6) and two non-synchronization tasks (610 and 630 in FIG. 6). Notice also that each synchronization task 620 and 640 has a synchronization phase 190 associated with it, shown as "phase="1"" in synchronization task 620 and "phase="2"" in synchronization task 640.

FIG. 7 shows a sample set of synchronization rules 186 as synchronization rules 700. Notice that each synchronization rule has a different synchronization phase defined, shown in rule 710 and 720. In another suitable implementation there could be a default phase that every rule without a specific phase attribute was assumed to have. In yet another suitable implementation there could be multiple phases assigned to each synchronization rule. Synchronization rules 700 define a rule 710 that populates a "chap_num" field and contains the synchronization phase 1, and a rule 720 that populates a "title_attr" field and contains the synchronization phase 2.

Figure 8:
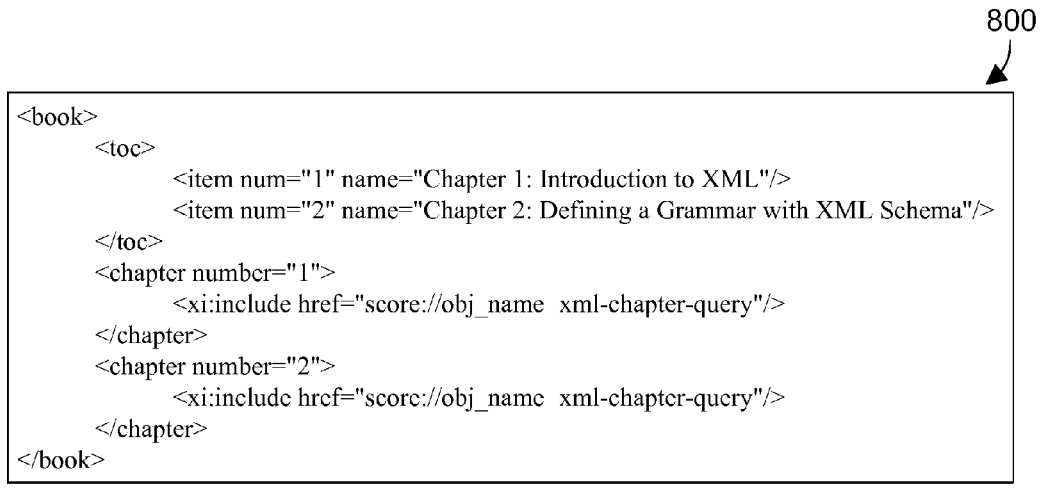
FIG. 8 shows a sample XML document template containing embedded queries.

Referring to FIG. 8, a sample XML document 800 is shown for the example herein. Notice that document 800 includes two inclusion links that link to query templates stored in the repository. When executed, each of these queries will return XML data to replace each query. In the prior art, both synchronization rules 710 and 720 would have to be evaluated at synchronization steps 620 and 640. With the synchronization phase disclosed herein, synchronization rule 710 is evaluated at synchronization step 620 and synchronization rule 720 is evaluated at synchronization step 640. The continuation of the example will illustrate this point.

Figure 9:
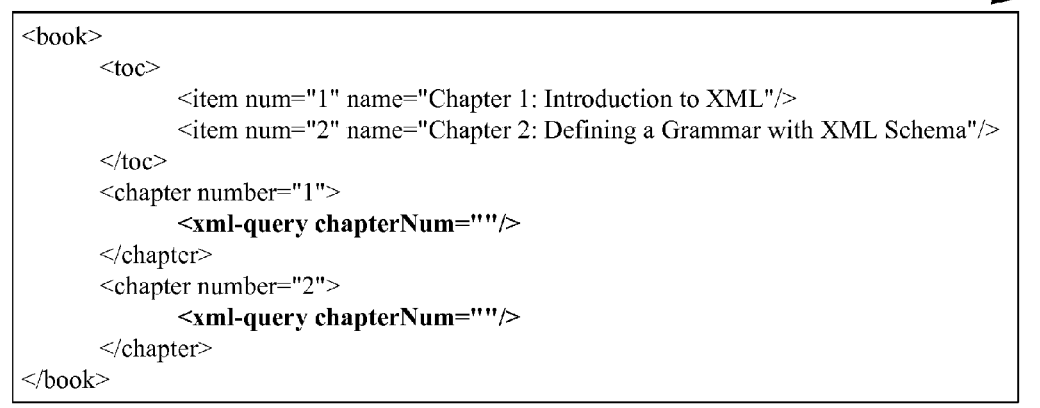
FIG. 9 shows the document in FIG. 8 after plug-in 610 has executed.
Figure 10:
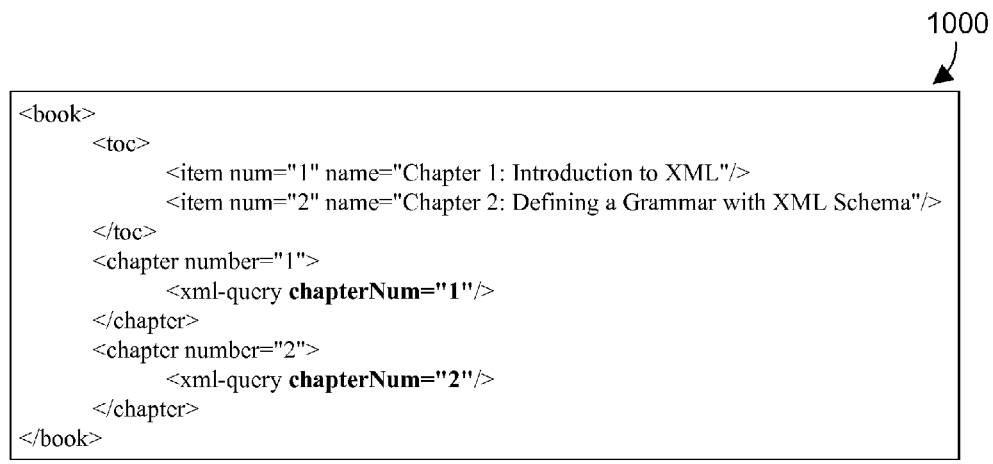
FIG. 10 shows the document in FIG. 8 after plug-in 620 has executed.

When a user checks document 800 out of the repository, plug-in chain 600 gets invoked to reconstitute document 800. Plug-in 610 is executed which resolves the links to embedded queries in document 800 and inserts the actual embedded queries shown as document 900 in FIG. 9. Plug-in 620 is then executed (step 410 in FIG. 4). Plug-in 620 is a synchronization plug-in that takes a phase parameter with value 1. This means that only synchronization rule 710 is evaluated because it is the only synchronization rule that has a phase parameter value equal to 1. The result of synchronization plug-in 620 is shown as document 1000 in FIG. 10. Notice how synchronization plug-in 620 has populated the embedded query parameters so that the embedded queries have the necessary information to execute properly.

Figure 11:
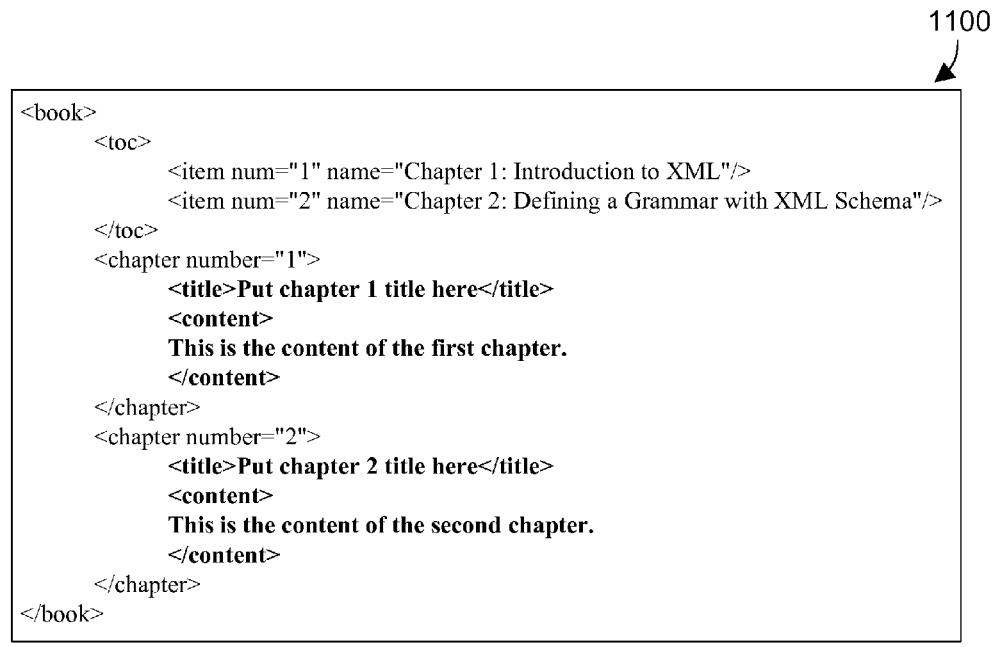
FIG. 11 shows the document in FIG. 8 after plug-in 630 has executed.
Figure 12:
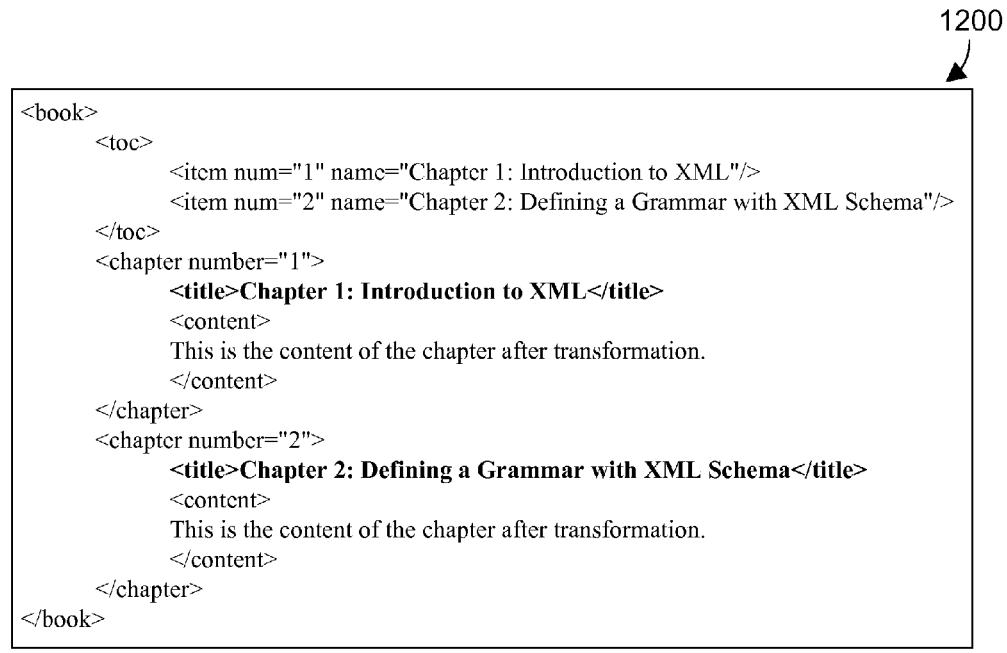
FIG. 12 shows the document in FIG. 8 after plug-in 640 has executed.

Plug-in 630 is executed which executes the embedded queries and inserts the query results into the document (step 420 in FIG. 4). This is shown as document 1100 in FIG. 11. Since there are no longer embedded queries in document 1100, a synchronization step is needed to insert the proper information into the document. Specifically for document 1100 the correct titles and content for both chapter one and chapter two need to be inserted into the document. This is performed by executing plug-in 640 which is a synchronization plug-in that takes a phase parameter with value 2 (step 430 in FIG. 4). This means that only synchronization rule 720 is evaluated because it is the only synchronization rule that has a phase parameter value equal to 2. The result of synchronization plug-in 640 is shown as document 1200 in FIG. 12. Notice that there are no embedded queries and all of the fields contain the correct data. A validation plug-in 650 is then evaluated to ensure the proper data.

The example given here differs from the prior art when evaluating synchronization plug-ins 620 and 640. In the prior art when synchronization plug-ins 620 and 640 are executed synchronization rules 710 and 720 are both evaluated for plug-in 620 and 640. Contrast this to the example given above where only synchronization rule 710 is evaluated when plug-in 620 is executed and only synchronization rule 720 is evaluated when plug-in 640 is executed. While in the simple example above the prior art only evaluates one more unnecessary synchronization rule per synchronization plug-in, as documents become more complex the number of evaluated unnecessary synchronization rules increases.

Figure 13:
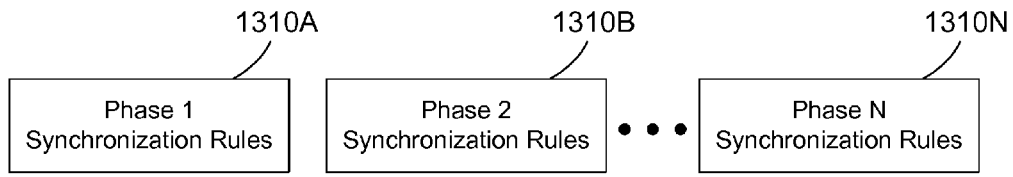
FIG. 13 shows different subsets of the synchronization rules in separate files.

The disclosure herein has discussed a phase attribute defined in the synchronization rules. Another suitable implementation would be to have each set or phase of synchronization rules in a separate file, as shown in FIG. 13. FIG. 13 shows subsets of the synchronization rules 186 stored in separate files, with phase 1 synchronization rules 1310A stored in a separate file, phase 2 synchronization rules 1310B stored in a separate file, through phase N synchronization rules 1310N stored in a separate file. This would allow the administrator to define a file that contains all rules pertaining to a specific phase. When synchronization is needed, instead of passing in a phase parameter, a filename could be passed in and all of the synchronization rules in that file would be evaluated. Each separate file would thus include a subset of the synchronization rules that apply to a given phase.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

The invention claimed is:

1. An apparatus comprising:
    at least one processor;
    a memory coupled to the at least one processor;
    a repository residing in the memory that includes a plurality of objects; and
    a content management system residing in the memory and executed by the at least one processor, the content management system managing the plurality of objects in the repository, the content management system comprising:
        synchronization rules comprising a first phase subset of the synchronization rules and a second phase subset of the synchronization rules, wherein one of the first phase subset and the second phase subset includes at least one synchronization rule that is not included in the other subset; and
        a phase synchronization mechanism that reconstitutes a document that includes embedded queries by evaluating the first phase subset of the synchronization rules to populate parameters of the embedded queries so the embedded queries may be executed, and by evaluating the second phase subset of the synchronization rules after the embedded queries have been executed.

2. The apparatus of claim 1 wherein the synchronization rules further comprises a third subset of the synchronization rules.

3. The apparatus of claim 2 wherein the phase synchronization mechanism evaluates the third subset of the synchronization rules at a time when the content management system needs to perform synchronization.

4. The apparatus of claim 1 wherein the first phase subset of the synchronization rules and the second phase subset of the synchronization rules are contained in separate files.

5. The apparatus of claim 1 further comprising a plug-in chain residing in the memory that specifies a plurality of plug-ins to be executed in a specified order, the plurality of plug-ins including the first phase subset and second phase subset of the synchronization rules.

6. A computer-implemented method for a content management system that manages a plurality of objects in a repository to reconstitute a parent document with embedded queries and evaluate synchronization rules, the method comprising the steps of:
    evaluating a first phase subset of the synchronization rules to populate parameters of the embedded queries so the embedded queries may be executed;
    executing the embedded queries; and
    evaluating a second phase subset of the synchronization rules after the embedded queries have been executed, wherein one of the first phase subset and the second phase subset includes at least one synchronization rule that is not included in the other subset.

7. The method of claim 6 wherein the first phase subset of the synchronization rules and the second phase subset of the synchronization rules are contained in separate files.

8. The method of claim 6 further comprising the step evaluating a third subset of the synchronization rules at a time when the content management system needs to perform synchronization.

9. The method of claim 6 further comprising the step of executing a plurality of plug-ins in a plug-in chain in a specified order, the plurality of plug-ins including the first phase subset and second phase subset of the synchronization rules.

10. A computer-implemented method for a content management system that manages a plurality of objects in a repository to reconstitute an XML document from a template of embedded queries and evaluate synchronization rules, the method comprising the steps of:

populating elements in the embedded queries;

evaluating a first phase subset of the synchronization rules contained in a first separate file to populate additional elements in the embedded queries;

executing the embedded queries;

evaluating a second phase subset of the synchronization rules contained in a second file separate from the first file after the embedded queries have been executed, wherein one of the first phase subset and the second phase subset includes at least one synchronization rule that is not included in the other subset; and evaluating a third phase subset of the synchronization rules contained in a third file separate from the first and second files.

11. An article of manufacture comprising:

(A) a content management system comprising:

synchronization rules comprising a first phase subset of the synchronization rules and a second phase subset of the synchronization rules, wherein one of the first phase subset and the second phase subset includes at least one synchronization rule that is not included in the other subset; and a phase synchronization mechanism that reconstitutes a document that includes embedded queries by evaluating the first phase subset of the synchronization rules to populate parameters of the embedded queries so the embedded queries may be executed, and by evaluating the second phase subset of the synchronization rules after the embedded queries have been executed; and (B) a non-transitory computer-readable media bearing the content management system.

12. The article of manufacture of claim 11 wherein the synchronization rules further comprises a third subset of the synchronization rules.

13. The article of manufacture of claim 12 wherein the phase synchronization mechanism evaluates the third subset of the synchronization rules at a time when the content management system needs to perform synchronization.

14. The article of manufacture of claim 11 wherein the first phase subset of the synchronization rules and the second phase subset of the synchronization rules are contained in separate files.

15. The article of manufacture of claim 11 further comprising a plug-in chain that specifies a plurality of plug-ins to be executed in a specified order, the plurality of plug-ins including the first phase subset and second phase subset of the synchronization rules.

* * * * *